UNITED STATES PATENT OFFICE.

ANTON MESSERSCHMITT, OF STOLBERG, GERMANY.

MANUFACTURE OF HYDROGEN.

1,109,448.  Specification of Letters Patent.  Patented Sept. 1, 1914.

No Drawing.  Application filed March 14, 1913.  Serial No. 754,335.

*To all whom it may concern:*

Be it known that I, ANTON MESSER-SCHMITT, a citizen of the German Empire, residing at Stolberg, Germany, have invented certain new and useful Improvements in the Manufacture of Hydrogen, of which the following is a specification.

This invention relates to the manufacture of hydrogen; and it comprises processes of producing hydrogen wherein reducing gases and steam are alternately brought into contact with a reaction mass comprising one or more of the metals of the iron group, such as manganese, nickel, cobalt, etc., with or without the presence of iron, or of surface giving carriers, such as clay, pumice stone, etc., all as more fully hereinafter set forth and as claimed.

In the commercial manufacture of hydrogen, one method in use rests on the employment of sponge iron, that is, an unfused porous mass of iron, which is alternately oxidized by steam with production of hydrogen and is reduced by contact with a reducing gas, such as water gas, producer gas, etc. The heat necessary for the various reactions may be imparted or carried to the iron in various ways, as by heating through a retort wall or by placing the material in a shaft or the like and conveying heat by superheating the draft currents prior to contacting with the iron. Latterly a combination of the two methods has come into use. In the use of iron alone in this manner, several disadvantages are encountered. One is the difficulty of maintenance of porosity. The yield of hydrogen in the steaming phase is directly proportional to the surface of iron exposed. It is therefore desirable to have the reaction mass as open and permeable as possible. And of course its disposition in the apparatus must be such as to permit free passage of draft currents from end to end while insuring actual contact of every portion of such a current with iron. But with pure iron it is difficult to maintain these optimum conditions after an apparatus has been in operation for some time. The iron silicates are rather fusible and ferrous oxid formed in the steaming phase is apt to slag down with included sand and silicate impurities or with the materials of furnace walls. And whenever the temperature of the reaction mass goes a little too high, the iron particles are apt to weld or fuse together somewhat, with destruction of the porosity; this fusion being particularly apt to happen where carbon is deposited in the reaction mass. In the reduction phase carbon-containing gases are apt to deposit a portion of their carbon by a catalytic action of the iron and wherever there is a deposition of carbon fusible iron carbids are apt to be formed. In actual operation it is difficult to prevent this deposition, and particularly in the colder parts of the apparatus. In the ensuing steaming or hydrogen-producing phase, this carbon causes impurities in the gas, the iron carbids being broken down by steam with the production of evil-smelling hydrocarbons.

I have found that other metals of the iron group, cobalt, nickel and manganese and admixtures with each other and with iron give better results. The presence of small quantities of any of these metals in or on an iron mass appears to improve its action materially. This is particularly true of a manganiferous iron mass. Manganese oxids reduce to manganous oxid readily and produce an exceptionally porous mass. Manganous oxid in the presence of free carbon reduces to metal which, of course, forms hydrogen with steam. An intimate mixture of manganese and iron oxids, such as may be obtained by using various manganese iron ores, or artificially produced admixtures, is particularly advantageous. In the reduction phase in operation, the iron oxid reduces mainly to iron while the manganese oxids reduce to manganous oxid, giving a very porous mixture of the two in the state of very fine division. From the nature of the mixture, the components cannot sinter or weld and cause the mass to lose its porosity. As a matter of fact, using natural manganiferous iron ores, they become and remain porous even in the interior of fist-sized lumps. The porosity is greater than with iron ores alone. The mixture therefore gives a mass of extraordinary activity. With ores it is in general better to roast previous to bringing into the hydrogen generator and thus remove water, organic constituents and sulfur. Roasting adds materially to the porosity. Instead of using natural ores, artificial mixtures of fine powdered oxids may be made in briquet form, sintered, melted, etc. If desired such artificial mixtures may contain refractory materials such as clay, oxids, silicates, pumice-stone, kieselguhr, etc. With such a manganese-iron mass the great advantage is shown that on reduction with carbon-containing gases, such as must be used in the reducing phase, practically no carbon is deposited since the manganese oxid which is present everywhere oxidizes such carbon at once with formation of manganese. No hydrocarbons therefore can be formed in the next steaming, or hydrogen producing, phase. And in the presence of the manganese, "poisoning" with sulfur combinations and dust is much less of a damaging factor. Nickel and cobalt ores or oxids, and their admixtures with iron oxids have much the same good effect. Manganese and nickel or cobalt oxids also form a good combination. The presence of nickel or cobalt improves an iron contact mass. In place of oxids or ores, there can be used metallic salts which break down to leave oxids in a state of fine subdivision. For example active reaction masses may be made by heating pumice stone, kieselguhr or the like, impregnated with a solution of ferrous and manganous sulfates. A solution of sulfate, acetate, nitrate, etc., of cobalt, of nickel or of manganese, may be used to impregnate iron ores or oxids. Sponge iron may be electroplated with nickel, cobalt or manganese. Mixtures of two or more iron group metals seem to be more sensitive and more reactive than any of the metals alone, i. e. they facilitate the reaction and allow lower temperatures to be used, which is of great technical importance. These contact masses may be used in any of the ordinary and known apparatus for the production of hydrogen. In the reduction phase they may be reduced by water gas, producer gas, oil gas, etc. Oil gases and the like, containing hydrocarbons, are much less detrimental here, and particularly with manganese-containing masses, than with iron alone. In the hydrogen producing phase or stage, steam may be employed as usual, being superheated to any degree desired. Superheat may also be used with the reducing gases.

The contact mass may be employed as powder on shelves, as lumps, as briquets, or in any other way desired. Artificial mixtures with clay and the like as a binder may be shaped in any form desired. For convenience, and as giving particularly good results, I prefer however to use the natural ores, and particularly manganese ores or manganese-iron ores. Cobalt and nickel ores may also be used. These ores may be in lump form, with the usual types of apparatus, the size of the lumps ranging from pea size to 4 or 5 inches in diameter. Dust or fine ore, except with special apparatus is less advantageous. The draft current of the reducing gases used in a reducing phase after passing through the mass may of course be burnt in heating proximity to such mass in order to afford heat for the reaction. Some unchanged reducing gases always go past the contact mass in greater or less proportion and the emerging mixture is usually combustible.

Reduction and heating of the contact mass may be simultaneously effected by using a draft current of reducing gases in a state of partial combustion, as by using a mixture of blue water gas with ten per cent. air.

What I claim is:—

1. In the manufacture of hydrogen, the process which comprises alternately contacting a current of reducing gas and a current of steam with a mass of material comprising oxids of two or more of the metals of the iron group and collecting the hydrogen produced by the latter current.

2. In the manufacture of hydrogen, the process which comprises alternately contacting a current of reducing gas and a current of steam with a mass of material comprising a manganese oxid and an oxid of another metal of the iron group and collecting the hydrogen produced by the latter current.

3. In the manufacture of hydrogen, the process which comprises alternately contacting a current of reducing gas and a current of steam with a mass of material comprising a manganese oxid and an iron oxid and collecting the hydrogen produced by the latter current.

4. In the manufacture of hydrogen the process which comprises alternate reduction and steaming of a pervious ferruginous reaction mass containing iron and sufficient finely distributed manganese oxid to maintain the porosity of the mass.

5. In the manufacture of hydrogen, the process which comprises alternately contacting a current of reducing gas and a current of steam with a mass of material comprising a native ore comprising manganese and iron and collecting the hydrogen produced by the latter current.

In testimony whereof, I affix my signature in the presence of two subscribing witnesses.

ANTON MESSERSCHMITT.

Witnesses:
 HENRY S. OTTO,
 ALBERT T. OTTO.